(12) United States Patent
Ormos et al.

(10) Patent No.: US 6,956,984 B2
(45) Date of Patent: Oct. 18, 2005

(54) LIGHT DRIVEN, INTEGRATED OPTICAL DEVICE

(75) Inventors: Pál Ormos, Szeged (HU); András Dér, Szeged (HU); Elmar Klaus Wolff, Witten-Annen (DE); Jeremy J. Ramsden, Bedfordshire (GB)

(73) Assignee: Biological Research Center of the Hungarian Academy of Sciences, Szeged (HU)

( * ) Notice: Subject to any disclaimer, the term of this patent is extended or adjusted under 35 U.S.C. 154(b) by 43 days.

(21) Appl. No.: 10/337,348

(22) Filed: Jan. 7, 2003

(65) Prior Publication Data

US 2003/0152358 A1 Aug. 14, 2003

Related U.S. Application Data

(63) Continuation of application No. PCT/HU01/00077, filed on Jul. 9, 2001.

(30) Foreign Application Priority Data

Jul. 7, 2000 (HU) .............................................. 0002588

(51) Int. Cl.[7] .............................................. G02B 6/26
(52) U.S. Cl. .............................. 385/16; 385/145; 385/5; 385/37
(58) Field of Search .............................. 385/16, 31, 37, 385/130, 145.5; 422/85.11; 435/5; 359/273

(56) References Cited

U.S. PATENT DOCUMENTS

| | | | |
|---|---|---|---|
| 544,802 A | | 8/1895 | Vansize |
| 4,795,226 A | * | 1/1989 | Bennion et al. ............... 385/12 |
| 4,804,834 A | | 2/1989 | Katsura et al. |
| 5,082,629 A | * | 1/1992 | Burgess et al. .......... 422/82.11 |
| 5,279,932 A | * | 1/1994 | Miyasaka et al. ......... 430/495.1 |
| 5,432,873 A | * | 7/1995 | Hosoya et al. ................. 385/21 |
| 5,470,690 A | | 11/1995 | Lewis et al. |
| 5,518,858 A | | 5/1996 | Dyukova et al. |
| 5,618,654 A | * | 4/1997 | Takei et al. .................. 430/347 |
| 5,757,525 A | | 5/1998 | Rao et al. |
| 5,781,330 A | * | 7/1998 | Kolodner et al. ........... 359/273 |
| 6,284,418 B1 | * | 9/2001 | Trantolo ....................... 430/20 |
| 6,366,388 B1 | * | 4/2002 | Hampp ........................ 359/241 |
| 6,381,072 B1 | * | 4/2002 | Burger ......................... 359/622 |
| 6,438,295 B1 | * | 8/2002 | McGarry et al. ............. 385/39 |
| 6,579,673 B2 | * | 6/2003 | McGrath et al. ............... 435/5 |

FOREIGN PATENT DOCUMENTS

| | | |
|---|---|---|
| DE | 42 41 871 A1 | 6/1994 |
| EP | 0 254 509 A1 | 1/1988 |
| EP | 0 433 901 A | 6/1991 |
| EP | 0 532 014 A | 3/1993 |
| EP | 0 800 106 A2 | 10/1997 |
| JP | 02310538 A | 12/1990 |
| WO | WO 00/30084 A1 | 5/2000 |

OTHER PUBLICATIONS

A, Kikineshy et al., "*Materials and Devices For Fibre Optic Sensors*", XP–0011036746, Multichip Modules with Integrated Sensors, pp. 181–184, 1996.

(Continued)

*Primary Examiner*—Ellen E. Kim
(74) *Attorney, Agent, or Firm*—Venable LLP; Robert Kinberg (57) ABSTRACT

A fully light-controllable integrated optical switch applicable in a slab geometry configuration includes a waveguide and an ad-medium in contact with the waveguide. The the ad-medium comprises a photochromic protein as a material of non-linear optical property, wherein switching of a light propagating in the waveguide is effected by a change of an optical property of the ad-medium caused by a light-induced transition of the photochromic protein from one defined molecular state to another.

26 Claims, 8 Drawing Sheets

OTHER PUBLICATIONS

Torchigin V P et al., "*Optical–Signal–Controlled Logic Elements For Computers*", Soviet Journal of Quantun Electronics, vol. 21 No. 11 pp. 1260–1264, Nov. 1, 1991.

B.S. Wherrett, "*Material For Optical*", Synthetic Metals, vol. 76, pp. 3–9, May 22, 1996.

D.Oesterhelt et al "*Bacteriorhodopsin: A Biological Material For Information Processing*" XP–002119796, Quarterly Reviews of Biophysics, vol. 24, No. 4, pp. 425–478.

R. Birge et al., "*Spatial Light Modulators and Optical Associative Memories Based On Bacteriorhodopsin*" Annual Inter'l Conference of the IEEE Engineering in Medicine and Biology Society, vol. 12, No. 4 pp. 1788–1789, Nov. 1, 1999.

R. Birge "*Protein–Based Optical Computing and Memories*", XP000331441, Computer, IEEE Computer Society, vol. 25, No. 11 p. 56–67, Nov. 11, 1992, Long Beach, CA.

R. Birge "*Protein–Based Three–Dimensional Memory*", XP001027875, American Scientist, vol. 82, p. 348.

S.P.Balashov, "*Photorections of the Photointermediates of Bacteriorhodopsin*", XP001028032, Ireal Journal of Chemistry, vol. 35, pp. 415–428.

A. Déet al, "*Introduction of a Method for Three–Dimensional Mapping of the Charge Motion in Bacteriorhodopsin*", XP00102832, Biophysical Chemistry, vol. 56, pp. 159–163, 1995.

A. Dér, "*Time–Resolved Photoelectric and Absorption Signals From Oriented Purple Membranes Immobilized in Gel*" XP001028027, vol. 10, pp. 295–300, 1985.

K. Tiefenthaler et al. "*Sensitivity of Grating Couplers as Integrated–Optical Chemical Sensors*", XP000049843, Journal of the Optical Society of America, vol. 6, No. 2, pp. 209–220, Feb. 1, 1989.

J.K. Lanyi, "*Proton Translocation Mechanism and Energetics in the Light–Driven Pump Bacteriorhodopsin*", Review, pp. 241–261, Dept. of Physiology and Biophysics, University of California, CA.

P. Ormos et al. "*Electric Response of a Back Photoreaction in the Bacteriorhodopsin Photocycle*", Biophys. J., vol. 31, pp. 207–213, Aug. 1980.

D.A. Parthenopoulos et al. "*Three–Demensional Optical Storage Memory*", Dept. of Chemistry, University of California Irvine, pp. 843–845, Aug. 1989, Irvine, CA.

J.J. Ramsden "*Experimental Methods for Investigating Protein Adsorption Kinetics at Surface*", Quarterly Reviews of Biophysics 27, pp. 41–105, 1993.

R.F. Service, *Science*: p. 1570, Jun. 16, 1995.

N.V. Tkachenko, "*Time–Resolve Refractive Index Change During the Bacteriorhodopsin Photocycle*", European Biophysics Journal 17: pp. 131–136, 1989.

G. Váró et al. "*Photoelectric Signals From Dried Oriented Purple Membranes of Halobacterium Halobium*", Biophysics Journal, vol. 43, pp. 47–51, Jul. 1983.

* cited by examiner

Fig. 8. Measured traces of refractive index change. The full time scale was 100 ms.

Fig. 9. Light-induced shift of the resonance incoupling curve calculated from traces demonstrated in Fig. 8.

LIGHT DRIVEN, INTEGRATED OPTICAL DEVICE

CROSS-REFERENCE TO RELATED APPLICATIONS

This application is a continuation of International Application No. PCT/HU01/00077 filed Jul. 9, 2001, designating the United States and claiming priority with respect to Hungarian Application No. P0002588 filed Jul. 7, 2000. The disclosures of both of the foregoing applications are incorporated herein by reference.

BACKGROUND OF THE INVENTION

The invention relates to integrated optical devices controllable fully by light comprising a protein as a material of non-linear optical property, and to complex integrated optical modules comprising the optical devices of the invention. The invention further relates to methods for carrying out logical operations and methods for the preparation of the ad-layer of the optical devices.

The optical device of the invention can be used in particular in the field of integrated optics, e.g. as a logical element, as an optical switch or as a sensor.

In the field of data processing or sensor technology optical systems (as opposed to the presently used type where the working basis is electrical) are generally believed to constitute the next generation with the promise of vastly improved performance in practically every aspect. The development of fundamental scientific knowledge and the required technology in the necessary fields forecasts the advent of revolutionary new devices either with direct applications or as building blocks of more complex systems.

At present, however, the level of the development of purely optical data processing devices is in its infancy; consequently, the development of highly complex systems seems not to be a task for the immediate future. Rather, the state of the art suggests a need for the testing of basic ideas, and finding the possibilities of basic classes of approaches.

Since the start of integrated electronics the expansion of development has been described by "Moore's law": the density (performance) of integrated electronic circuits doubles about every 1.8 years. While this "law" has remained proven valid for a remarkable period of 30 years, there is a general perception that the evolutionary development has reached a limit. Molecular electronics combined with optical data processing is regarded as being among the most promising emerging alternative technologies.

Key solutions are expected to emerge on a new field of optics, called integrated optics. New type of logical circuits may be created from integrated optical devices (IOD) integrated on a small substrate as various optomodules. The fundamental unit of an integrated optical device is an optical waveguide. Via a prism or a grating coupler, light may be confined to a high refractive index, thin waveguide layer, the totally reflecting walls of which result in a phenomenon analogous to the quantum mechanical particle in a box. Here the walls are of finite height and thickness, hence the field is a standing wave within the box and evanescent beyond the walls, dying away exponentially. Only certain discrete modes (transversal electronic, TE and transversal magnetic, TM modes) can exist within the box that can be characterized by the Maxwell equations.

If the waveguide is coated with an applied medium (ad-medium) or preferably a thin film (or ad-layer) comprising a nonlinear optical (NLO) material, which (interacting with the evanescent part of the light beam) are capable of manipulating the light by changing one or more of their optical properties under the influence of an applied voltage or another light beam, the so obtained device can be utilized in integrated optics.

Intensive research is going on to seek the most suitable NLO materials that could meet the demanding requirements of applications, in particular high sensitivity accompanied with high stability [Service, R. F., (1995)].

The basis of operation is that the refractive index of the ad-layer changes according to an external perturbation.

Since the theory and measuring techniques for integrated optics are well-developed [see e.g. K. Lizuka: Engineering Optics (Springer-Verlag, Berlin, Heidelberg, 1987)], the main limitations are of a technical nature, namely to find the proper NLO materials for the particular applications envisaged.

In the field of integrated optics most frequently liquid crystals are used as NLO materials. Nevertheless, usually their electrooptical effect is utilized, that is light-control is carried out indirectly via photoelectronic converters (e.g. photodiodes) [see K. Lizuka: Engineering Optics (1987), above]. Up to the present, the art does not teach nor suggest fully light driven, integrated optical devices comprising protein as photochromic material. In particular, the art does not disclose the use of such photochromic proteins in ad-medium of integrated optical devices. Further, according to the art no disclosure of the manipulation of the propagating light in the waveguide by light controlled change of the refractive index of such ad-layers can be found. There exists a need, however, for such devices in the pertinent field of art.

The invention is based on the finding that a simple and reliable integrated optical device can be provided if an appropriate protein is used as an NLO material and an appropriate setup (arrangement), disclosed herein, is used.

An optical switch for optical fibres and working on a basis different from integrated optics is disclosed by Kobayashi Y. and Matsuda Y in EPA 0,433,901, wherein the use of a fulgide combined with a macromolecular polymer in optical fibres [mainly used in the field of telecommunication and having a significantly larger thickness than integrated optical (IO) waveguides] is described. Furthermore, in their device, though it works on the basis of changing the refractive index of the medium coating the fibre, a modulation event can take place only if the refractive index of the whole medium is nearly the same as that of the light coupling region. In EPA 0,532,014 [Hosoya, T. (1993)] an improved version of said switch is disclosed, in which the photosensitive material is placed between two waveguides. Again, precise setting of the refractive index of the medium carrying the photosensitive material is crucial.

Up until now the relating field of art has remained silent regarding the combination of photosensitive proteins and integrated optics.

During the past 10 years, several laboratories in the USA, Europe and Japan have worked on the development of parallel-processing devices, three-dimensional data-storage hardware and neural networks based on photosensitive proteins, in particular on bacteriorhodopsin (bR) [see, e.g., Parthenopoulos, D. A. and Rentzepis, P. M. (1989), Oesterhelt, D., Brauchle, C. and Hampp, N. (1991), Birge, R. R. (1992), Birge, R. R. (1994)]. The suggested applications so far have concentrated on optical data storage [Lewis A. et al, (1995), U.S. Pat. No. 5,470,690], sensor technology [Sakai T et al (1989) U.S. Pat. No. 4,804,834] and holography [Trantolo, D. (2000), WO 00/30084].

An optical switch utilizing the proton pump property of bR is disclosed in JP2310538 [Watanabe T., (1990)]. In U.S. Pat. No. 5,757,525 [Devulapalli V. G. L. N. R. et al., (1998)] an all optical device is described, in which three input radiation fields spatially overlapping on a bR sample are applied in a special geometry. Irradiation of the sample by a modulating radiation field results in a change in the bR state and consequently in the signal. No waveguides, so important in integrated optics, are used in either of the above solutions. In U.S. Pat. No. 5,618,64 [Hiroyuki T. and Norio S. (1997)] well defined partially permeable mirrors are used to control light transmission on the bR layer placed between the mirrors.

Neither of the above applications aimed and is not appears to be applicable in the field of integrated optics.

SUMMARY OF THE INVENTION

Therefore, an object of the invention is to provide a useful integrated optical device fully controllable by light, the device comprising protein as an NLO material.

The inventors found that if a film of photochromic (photosensitive) protein, is deposited on the surface of a waveguide the light having been coupled into the waveguide can be modulated by changing the molecular state (and thereby the refractive index) of the protein using a modulating light beam of an appropriate wavelength.

In an embodiment, if the light is coupled into the waveguide by a grating, the angle at which efficient coupling takes place largely depends on the refractive index of the material around the grating. Thus, if the layer of the protein is deposited directly above the grating the intensity of the coupled light is modulated by the light-induced molecular reactions, at a given coupling angle. Furthermore, the light beam traveling in the waveguide can be coupled out using a grating created in the layer comprising the photosensitive protein.

Thus, the invention relates to an integrated optical device fully controllable by light comprising protein as a material of non linear optical property. Preferably, the device is fully light driven.

Preferably, the integrated optical device of the invention comprises a waveguide, a coupling unit and, in contact with the waveguide, an ad-medium, preferably an ad-layer. The ad-layer comprises a photochromic protein and, preferably, a transparent, inert, film-forming material.

More preferably, the waveguide comprises a thin layer wave-carrying medium on a substrate (support) and the photochromic protein is a member of the bacteriorhodopsin family. As a coupling unit the waveguide may comprise a grating and, optionally, a prism. The grating can be a grating formed at the boundary interface of the waveguide and/or can be located in the ad-medium. The grating located in the ad-medium can be a transient grating or a permanent grating, the latter preferably being formed by holographic exposition.

In a further aspect, the invention relates to a use of any of the above integrated optical devices as an optically controlled optical switch or as an integrated optical logical element or any other integrated optical device.

The invention also relates to a complex integrated optical module comprising any optical devices of the invention as a logical element.

In a further aspect, the invention relates to a method for carrying out a simple logical operation using a fully light controllable integrated optical device comprising a protein as a material of non linear optical property, comprising i) coupling light, into a waveguide ii) changing an optical property of the protein located in an ad-medium of the waveguide by using a modulating or control light, preferably a modulating laser, and thereby affecting the propagation of light in the waveguide.

Preferably, the integrated optical device is any of the devices disclosed herein.

Preferably the refractive index of the protein in the ad-medium is changed by inducing a transition between at least two molecular states of the protein, e.g. by switching the protein from one stable or metastable state to another.

The protein preferably is a member of the rhodopsin family, highly preferably bacteriorhodopsin.

The incoupled light is preferably a monochromatic light, more preferably a laser beam.

In a further embodiment i) in the resting state light is not coupled in, then ii) coupling in is achieved by changing the refractive index the ad-layer by using a modulating or control light.

A further possibility is coupling out the light traveling in the waveguide.

Thus, in a further preferred embodiment for coupling light in and/or out a grating at the boundary surface of the ad-layer and/or a transient grating in the ad-medium and/or a permanent grating in the ad-medium, preferably prepared by holographic exposition, is used. The holographic exposition is preferably holographic bleaching.

For coupling light in and/or out a prism also can be used.

In a highly preferred embodiment i) the monochromatic light is coupled into the waveguide using a grating in a well defined angle and ii) the light is modulated in the waveguide by changing the refractive index in the part of the ad-layer covering the grating.

In a further aspect the invention relates to a method for the preparation of an integrated optical device of the invention, comprising i) coating the surface of a waveguide with an ad-medium, preferably an ad-layer, comprising a protein of non linear optical property, preferably of the bacteriorhodopsin family, and, optionally ii) preparing, within the ad-layer, either a transient, holographic grating by the interference of two identical laser beams or a permanent grating by holographic exposition, e.g. by bleaching.

Preferably, the coating is carried out by preparing a water suspension of bacteriorhodopsin, mixing the suspension with an inert, film-forming material, preferably gelatine, whose final concentration is 0.1 to 0.6% preferably 0.5% and applying the obtained medium, preferably as an ad-layer, to the waveguide, and drying, e.g. under air flow, preferably laminar air flow, the ad-medium.

DEFINITIONS

The term "optical waveguide" refers to a device in which light propagates in a confined geometry via multiple total reflections, and which comprises a "wave-carrying medium" and, if desired, a substrate for supporting the "wave-carrying medium". The "wave-carrying medium" is a thin layer (preferably less than 100 nm) or fibre of a material of a sufficiently high index of refraction to achieve totally reflecting boundaries of the medium, analogously to the quantum mechanical particle in a box. The walls are of finite height and thickness, hence the field is evanescent beyond the walls, dying away exponentially.

A "non linear optical" (NLO) material can change its optical property/properties (e.g. index of refraction, absorption etc.) on external influences (electric field, temperature, pH, reagents etc.), preferably upon excitation by light.

"Integrated optics" is a field of optics aiming to integrate various optomodules on a small substrate The slab geometry is one of the most fundamental configurations in integrated optical technology, consequently the optomodules usually contain thin film devices. Such an integrated optical device can be e.g. an optical switch, a logical gate, an optical modulator, a sensor etc. or a more complex device, e.g. a logical circuit using the above basic devices as building blocks. An optical device can be all optical (fully light driven), or electrooptical.

An "ad-medium", preferably a thin layer ("ad-layer"), is a medium comprising the NLO material and being in close contact with the wave carrying medium.

"Light is meant herein as an electromagnetic radiation in the infrared, visible or ultraviolet range. According to a preferable embodiment of the invention, e.g. for delivering or processing information, monochromatic light, more preferably laser is applied.

"Modulating radiation" or "modulating light" is understood as a radiation or light capable of changing an optical property of an NLO material. According to the invention when a modulating light is used the wavelength of said light is defined by the energy level differences between molecular states of the photochromic protein. When bacteriorhodopsin (bR) is used the modulating light is a visible laser beam capable of exciting the bR-molecule from its ground state (bR) to the M state.

A "photochromic protein" is a protein the absorption spectrum and/or the refractive index of which changes upon effect of an appropriate wavelength light.

DETAILED DESCRIPTION OF THE INVENTION

The technology used in the invention is based upon the modulation of light conductivity in optical waveguides utilizing nonlinear optical (NLO) properties of photochromic proteins (photosensitive proteins or chromoproteins), e.g. bacteriorhodopsin. Since optical transitions of such proteins can be initiated in a number of ways, light modulation in the waveguides can be achieved actually not only by an external light, but also by various external factors. Consequently, optical switching devices with significantly different properties can be constructed.

Some embodiments of the invention are explained below and illustrated by the examples. Nevertheless, a person skilled in the art will understand that in the knowledge of the present disclosure many other embodiments of the invention can be carried out without undue burden and within the scope of the invention.

Grating Coupling Modulated by the Refractive Index of Bacteriorhodopsin

Figure 1:
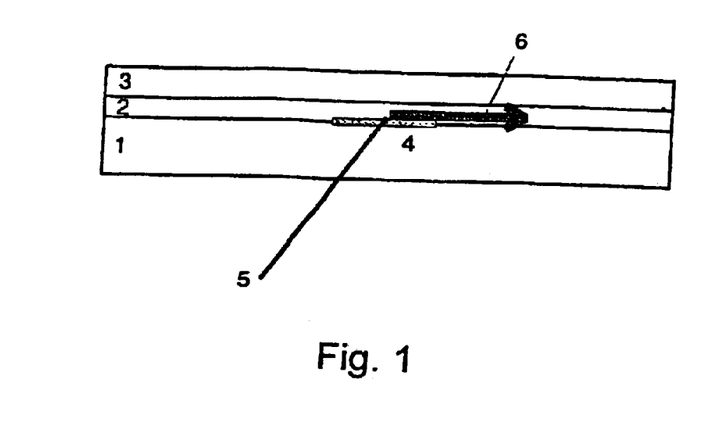
FIG. 1 is as schematic representation of a three-layer waveguide.

In this scheme light is coupled into the waveguide by a diffraction grating formed in the waveguide. FIG. 1 illustrates an integrated optical device designed for that purpose. The waveguide comprises a substrate (1) and a wave carrying medium (2). The ad-medium (3) [in this case an ad-layer (3.a), e.g. a layer of Bacteriorhodopsin] is deposited directly above the grating (4).

Efficient coupling is a very sensitive function of the coupling angle. The angle at which efficient coupling takes place largely depends on the refractive index of the material around the grating. Consequently, the change of the index of refraction of the ad-layer can be very sensitively followed by measuring the coupling angle. Alternatively, at a given coupling angle the intensity of the coupled light is modulated by the reactions effecting the refractive index.

In a suitable angle an incident light beam (5) is sent to grating (4) in the waveguide. Said light beam, provided that the above-mentioned conditions are met, is coupled into wave carrying medium (2). By changing the refractive index of ad-medium (3), carried out in this embodiment by exciting the bacteriorhodopsin molecule, the conditions of successful coupling change too. Thereby the propagation of the guided light beam (6) can be arrested. Alternatively, the light beam to be coupled into the waveguide can be sent to the grating (4) in an angle defined by the refractive index of the excited state of the bacteriorhodopsin, and coupling in is allowed by the excitation of the bacteriorhodopsin molecules in the ad-layer.

Coupling Light Into and Out of the Waveguide by a Transient Grating Formed in the Ad-Layer by Holographic Excitation Here the grating for coupling is formed within the ad-layer by appropriate light excitation: light excitation by two uniform laser beams interfering in the ad-layer produces a holographic grating within the ad-layer. This transient grating can act as a coupling grating, achieving a grating for the duration of the photoreactions in bacteriorhodopsin. The transient grating can be used both as a phase-grating (by coupling light where there is no absorption change during the photoreaction) or as an absorption grating (where absorption at the wavelength of the coupled light changes during the photoreaction).

This arrangement is clearly useful for coupling light both in and out. In the second case, i.e. when a transient grating is used for coupling out, light can be coupled in by a prism and the light beam coupled in this way can be removed from the waveguide controlled by the transient grating. Note that in this case, due to the use of prism, high light intensities can be handled. When a grating is used to couple the light in, only a small portion of the light is transferred into the waveguide. This can be an important point when selecting layouts for switching applications.

Figure 7:
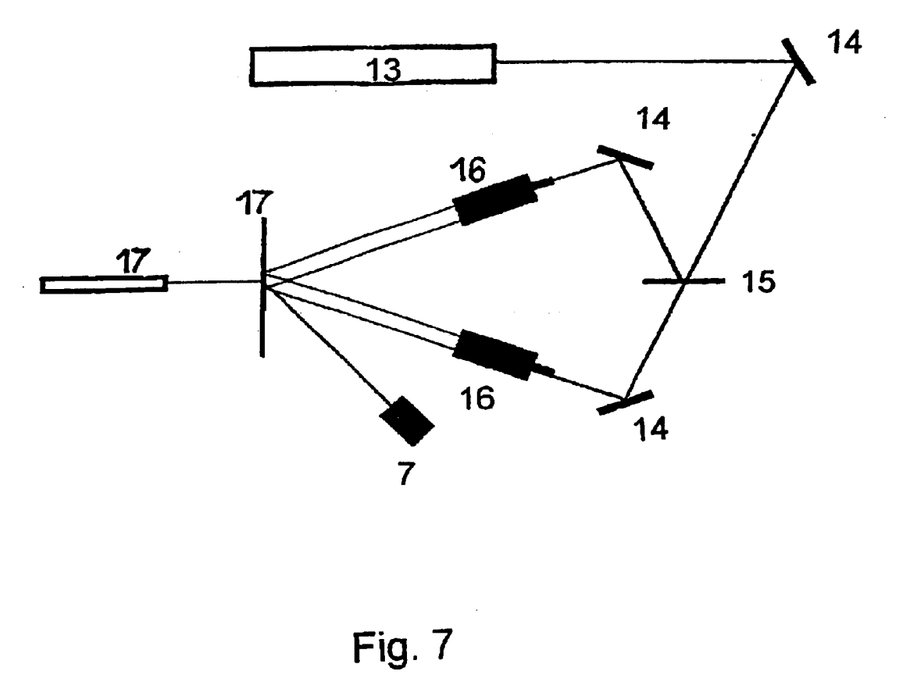
FIG. 7 is a schematic showing a scheme of the holographic setup for providing a holographic grating.

A holographic grating can be created e.g. by the experimental setup shown on FIG. 7. A laser beam from a He—Cd laser source reflected by mirror (14) to variable beam splitter (15) sending the light to further mirrors (14'). The two light beams, having passed beam expanders (16) meet each other in the bacteriorhodopsin film (17) creating an interference pattern. Scattering of laser beam (7) by the holographic grating can be detected by photodiode (10).

Coupling Light Into and Out of the Waveguide by a Grating Formed in the Ad-Layer by Holographic Bleaching In the presence of certain chemicals (e.g. hydroxylamine) bacteriorhodopsin just as other proteins of the Rhodopsin family is bleached by light. This phenomenon can be used to burn permanent gratings into the bacteriorhodopsin ad-layer by applying holographic excitation as described in the previous paragraph. When the photocycle is initiated in bacteriorhodopsin, this grating changes its efficiency at different wavelengths, according to the changes in the absorption spectrum.

Optically Controlled Optical Switch

Each above-mentioned way for modulating light transfer in the waveguide by photochromic proteins, e.g. bacteriorhodopsin can be applied for building optically driven light switch. As a consequence a number of suitable method can be provided The inventors' present knowledge suggests that in highly preferred embodiments the light is coupled into the waveguide by a prism and outcoupling is achieved by a grating created in the ad-medium. The advantage of this embodiment is the high intensity of the handled light. Namely, a highly preferred switch allows output light intensities which are sufficient to operate further switches. This is particularly useful when complex logical circuits are designed.

Controlling of Optical Switches

In a preferred embodiment of the invention systems with different time characteristics can be built using different chromoproteins or protein mutants either with characteristic reactions following different kinetics or with different colors, etc. Many mutant variant of bR is known in the art. Using these protein variants the timing of the transients, which can be important for the application of optical switches, becomes controllable. Such mutant proteins are e.g. the following mutants; Asp85→Asn and Asp85→Thr.

In all the following examples, the timing of the changes can be varied arbitrarily: it can be dynamic with characteristic times from picoseconds to infinity, static, also bistable (switching between two stable states by illumination with lights of different colors). Operation in all modes can be verified in detailed kinetic experiments with an appropriate time resolution, e.g. following the exemplary methods disclosed herein.

Besides using different proteins or protein variants, a further possibility is to utilize the different states of the reaction cycle of the photochromic protein, e.g. bacteriorhodopsin.

By these methods switches or other integrated optical devices, e.g. sensors of various reaction time, of various sign/noise ratio or sensible for light of various wavelengths can be created. This versatility can be efficiently utilized in integrated optical logical circuits.

From these mutant or variant proteins sequentially connected switches, gates or other elements of various property can be formed, which can be advantageously used in simple logical circuits. A person skilled in the art of integrated optics will know a number of various logical elements.

For experiments where short excitation pulses with different wavelengths are needed e.g. a tunable pulsed laser (e.g. flashlamp pumped Nd:YAG laser with Optical Parametric Oscillator) can be applied.

Complex Logical Optoelectronic Devices

Once efficient optical switches are developed, complex devices using them as building blocks can be constructed.

It should be recalled that the above-mentioned devices can form the elements of optical computing. Here the logical circuits necessary for realizing functions of a computer may be created. The finally aimed product is a model computer that operates fully by light.

The methodology used in the described exemplary embodiments of the invention is explained below both in theory and from a practical view.

Relevant Properties of the Chromoproteins Applicable in the Invention

On the basis of the description it is assumed that in principal any protein of NLO property, in particular proteins which change their refractive index upon an appropriate wavelength light, can be used in the invention.

Such proteins are e.g. proteins involved in photosynthesis and sensation of light. In a preferred embodiment proteins of the rhodopsin family are used, e.g. visual rhodopsins such as rhodopsins comprising retinal-1 or retinal-2 as a chromophore or rhodopsins of the bacteriorhodopsin type such as halorhodopsins, phoborhodopsins, chlamyrhodopsins or sensory rhodopsins. In a particularly preferred embodiment bacteriorhodopsin is used.

Bacteriorhodopsin is a protein-pigment complex from the cell membrane of *Halobacterium salinarium*. It is a biological light energy converter: upon absorption of a photon it pumps a proton across the cell membrane, i.e. it converts the energy of light into the electrochemical energy of the created transmembrane proton concentration difference. This is its biological function, which is, however, actually irrelevant in respect of many bio-electronics applications.

Bacteriorhodopsin is very easy and cheap to produce in practically unlimited quantities. The bacteria are easy to grow and the pigment is easy to separate. The isolated bacteriorhodopsin (unlike most biological samples) is extremely stable: solutions, or dried films with practically unlimited activity (in time) can be produced.

Genetic engineering techniques to produce modified proteins are well established. According to the art, species with advantageously modified kinetic parameters can be prepared.

The function of bacteriorhodopsin is based upon a sequence of photochemical reactions, the photocycle, [Der, A. and Ormos, P. (1995)] Following light excitation during the photocycle the bacteriorhodopsin molecule changes its optical absorption, refractive index and charge distribution (Tkachenko, N. V., Savransky, V. V. and Sharonov, A. Y. (1989)); these properties can be used separately or simultaneously in opto-electronic devices. Gels and thin films containing oriented bR molecules [Der, A., Hargittai, P. and Simon, J. (1985), Varo, G. and Keszthelyi, L. (1983)] are extremely stable, they maintain their photoelectric activity at the same level for several years. On the other hand, the photocycle of bacteriorhodopsin can be controlled in many different ways. For example, the population states of the intermediates can be manipulated by a combination of orange and blue light illumination in situ [Ormos, P., Dancshazy, Z. and Keszthelyi, L. (1980)], while special site-directed mutant bacteriorhodopsins with drastically altered optical properties and photocycle kinetics created by genetic engineering techniques are available (for a review, see [Lanyi, J. K. (1993)]).

There have been numerous attempts to design devices to utilize one or more of these properties. However, to our knowledge up till now the combination of bacteriorhodopsin and integrated optics has not been attempted.

Thin Films of Native and Mutant bR

In all applications described below the key to effective function is a film of good optical quality. Thin films of native and mutant bacteriorhodopsin can be prepared e.g. on a glass surface by one or more of the following methods: gel-formation [(Der, A., Hargittai, P. and Simon, J. (1985)], vacuum-drying [Varo, G. and Keszthelyi, L. (1983)], and the Langmuir-Blodgett (LB) technique [Niemi, H., Ikonen, M., Levlin, J. M., Lemmetyinen H. (1993)]. Lb-films of pure all-trans and 13-cis retinal (the chromophores of bacteriorhodopsin) are also considered in practical applications for two purposes: retinal, as a carotenoid, is a voltage-sensitive dye: its optical density and, consequently, its refractive index are strongly dependent on the local electric field; on the other hand, because of a specific reaction with the free radical $^1O_2$, it undergoes a cis-trans isomerisation change [Krinsky, N. I. (1971) ] which also alters its optical and electrical properties. Any of these methods can be appropriate for the preparation of suitable films.

In the exemplary method described herein we prepared a water suspension of bacteriorhodopsin and mixed with gelatine, whose final concentration was 0.5%. Upon drying under laminar air flow, a film of optical quality was developed. Instead of gelatine any transparent, inert (regarding bacteriorhodopsin), film-forming material can be applied. Preferably, the upper limit of gelatine concentration is defined by the fact that the photochromic protein should not be extremely diluted (i.e. evidently a sufficient amount is required), and the lower limit is defined by the occurance of cracks in the bacteriorhodopsin film. The concentration of gelatine is preferably 0.1 to 0.6%, more preferably 0.4 to 0.55%, e.g. about 0.5%.

Optical Waveguides

A basic element of integrated optical devices is the optical waveguide. Herein, on top of a glass substrate a thin (preferably less than 200 nm, more preferably less than 100 nm thick) layer of a material of very high (e.g. about 2) index of refraction is acting as an optical waveguide: light travels along the layer within it. Note that the thickness of the wave-carrying layer is preferably significantly smaller than the wavelength of the light. The evanescent character of the travelling light is therefore very pronounced (a large part of the light wave extends out of the layer).

Light is coupled into the waveguide usually by a diffraction grating formed at the interface of the waveguide layer. The geometrical conditions for effective coupling in this case are very strict: only light coming at a very well defined angle with respect to the grating is coupled into the waveguide. By changing the refractive index adjacent to the grating the coupling can be arbitrarily modulated. Thus, optical switching can be established. Analogously, outcoupling can be carried out in the opposite way.

EXAMPLES

Example 1

Provision for Waveguides

The waveguide used in the examples consists of a planar glass support plate (substrate) and a layer of material of high index of refraction, typically a $SiO_2$—$TiO_2$ solid solution. The thickness of the layer is small (e.g. about 100 nm), much smaller than the wavelength of the guided light. The efficiency of the waveguide is determined by the layer thickness (by influencing the evanescent character of the light) and the consistency of the material of the layer (depending on the method of producing the layer—evaporation, SOL-GEL technique). The waveguide parameters optimal for stable light guide properties and effective modulation by bacteriorhodopsin were determined.

Grating-coupled optical waveguides [Tiefenthaler, K. and Lukosz, W. (1989) J. Opt. Soc. Am. B 6:209–219] made by sputtering a thin film of Si(Ti)O2 (refractive index, n=1.77) onto a Corning C7059 glass substrate (n=1.53) were obtained from Artificial Sensing Instruments (ASI), Zurich, or prepared in the KFKI ATKI, Budapest with modifications of the standard technique. As an ad-layer, a bacteriorhodopsin film was deposited on the surface of the waveguide (FIG. 1). Water suspensions of wild type (or point-mutated) bR (OD=40 at 570 nm) were prepared by the standard technique [Oesterhelt, D. and Stoeckenius, W. (1971) Nature 233:149–152], and mixed with gelatine (Sigma), whose final concentration was 0.5%. Upon drying under laminar air flow, a film of optical quality was developed.

Example 2

Measurement of the bR-Refractive Index by the Waveguide Technique

Figure 2:
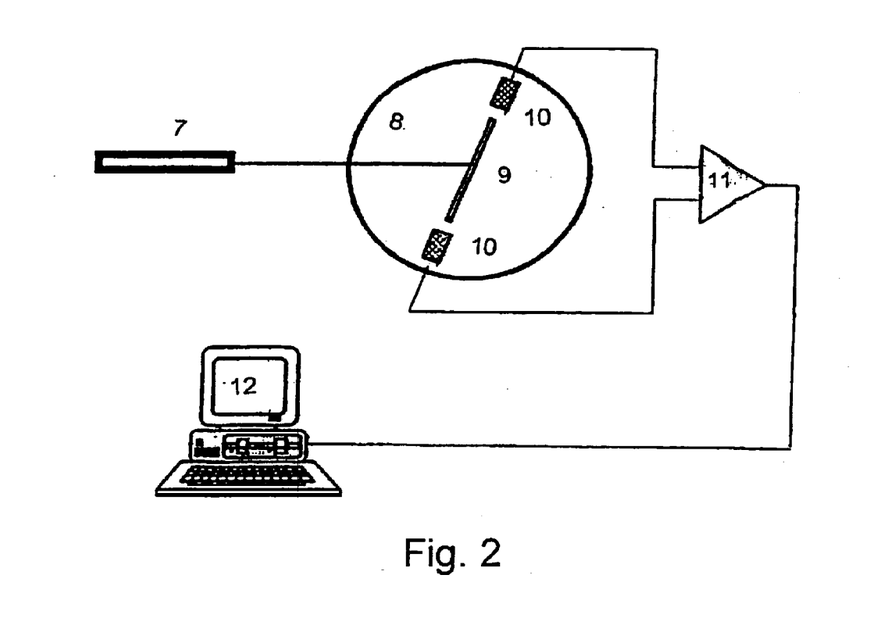
FIG. 2 is a sketch of an experimental setup disclosed in the description.
Figure 3:
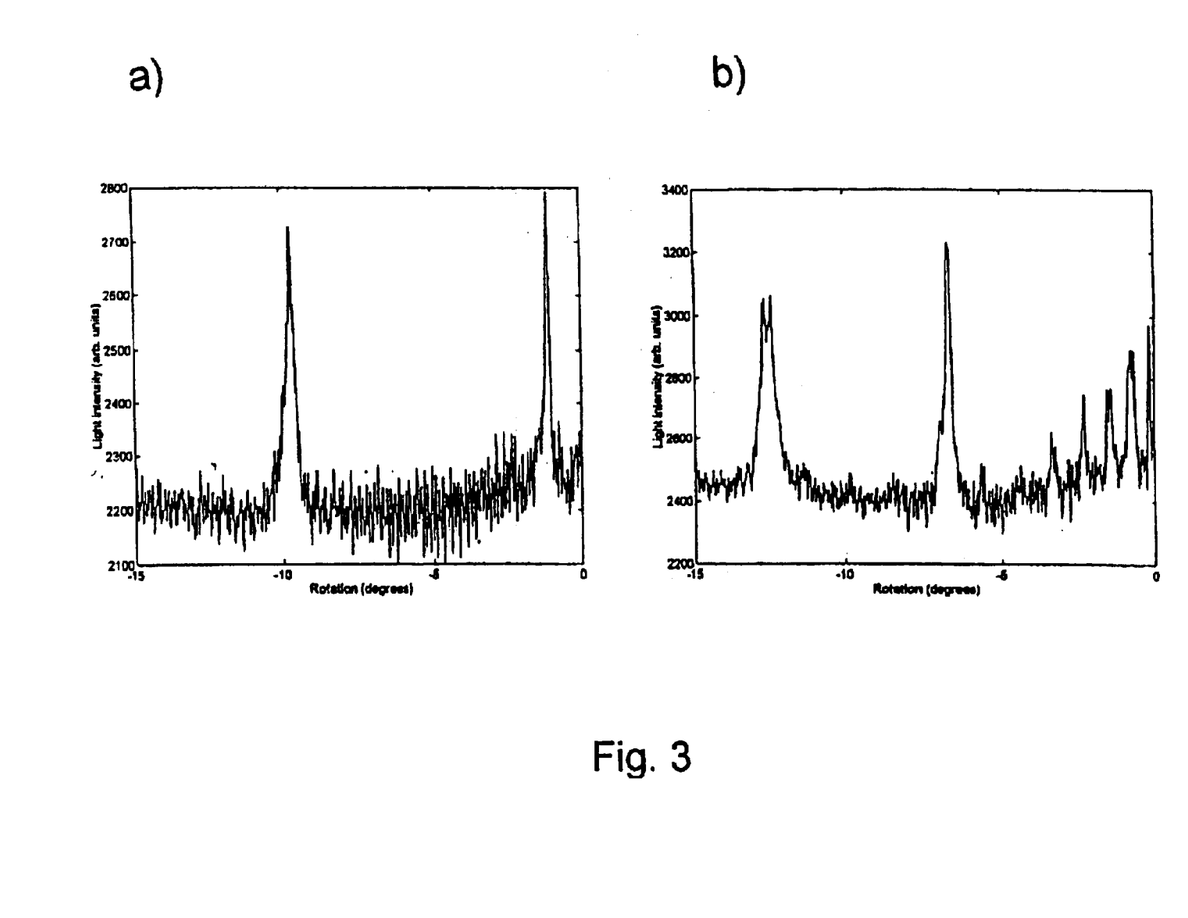
FIG. 3 is diagram showing light intensity at the edge of the waveguide versus the angle of incidence without (a) and with (b) a bacteriorhodopsin ad-layer.

The experimental setup consisted of a laser beam source (7) (10 mW He—Ne Laser; Melles Griot, Carlsbad, Calif., USA), a computer (12) controlled rotational turntable (8) (Ealing Electro-Optics) so as to vary the angle of incidence, and a pair of photodiodes (10) measuring the intensity of the guided light at the edges of the waveguide (9) (FIG. 2). The obtained sign was analyzed using amplifier (11). Computer records of guided light intensity versus the angle of incidence are depicted in FIGS. 3*a* and *b*. Peaks measured at 1.1 and 9.8 degrees in FIG. 3*a* represent the TE (transversal electronic) and TM (transversal magnetic) modes of a bare waveguide, respectively [Ramsden, J. J. (1994)].

The large shift of these peaks (6.8 and 12.5 degrees) in FIG. 3b is due to the effect of the bR refractive index. In order to evaluate the results, the solution of the grating equation for the incoupling conditions and the mode equation for a three-layer planar waveguide [Tiefenthaler, K. and Lukosz, W. (1989)]. As a result, n=1.52 is given for refractive index of a dried bacteriorhodopsin film.

Figure 4:
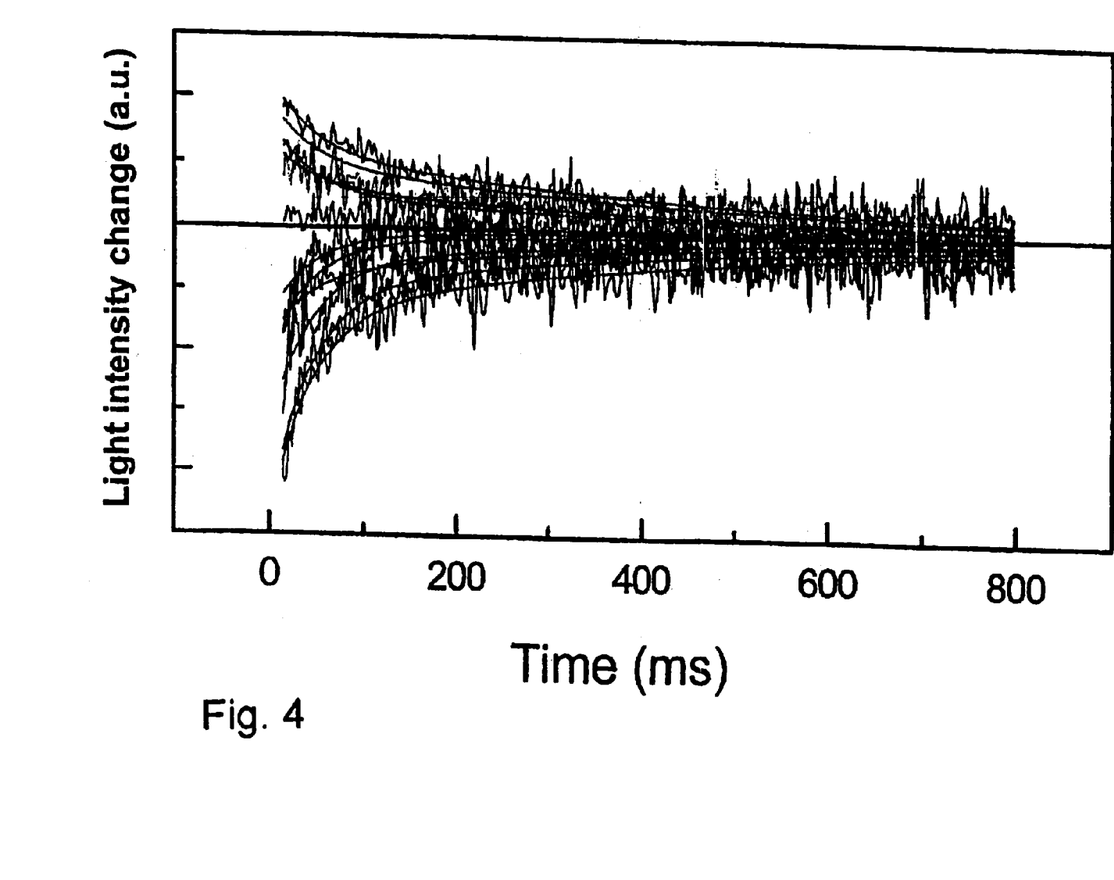
FIG. 4 is a diagram showing intensity changes of the guided light following the flash-excitation versus time at selected positions of the rotational turntable (8).
Figure 5:
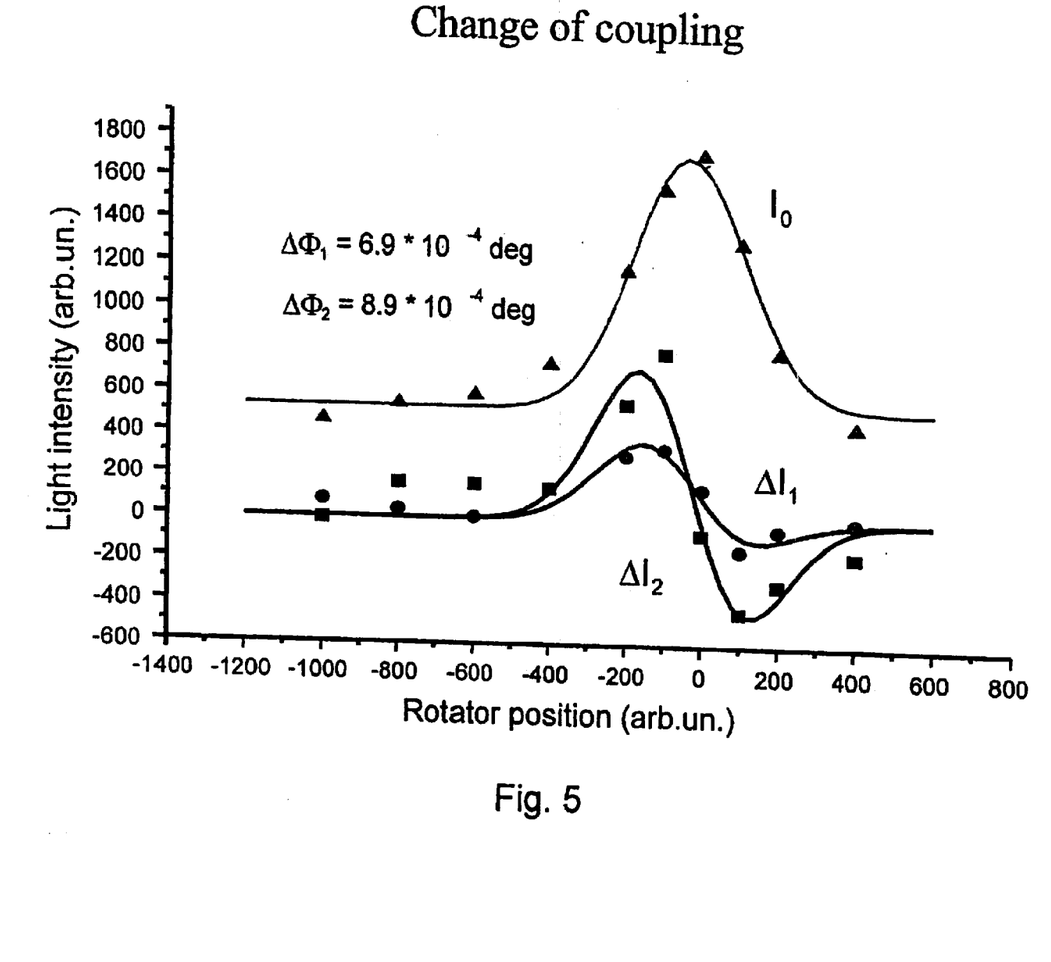
FIG. 5 is a diagram showing angular dependence of the baseline ($I_0$) and the amplitudes of the two exponential components ($\Delta I_1$, $\Delta I_2$) fitted to the curves in FIG. 4. ($\Delta \Phi_1$ and $\Delta \Phi_2$ are the angular shifts in degrees).
Figure 6:
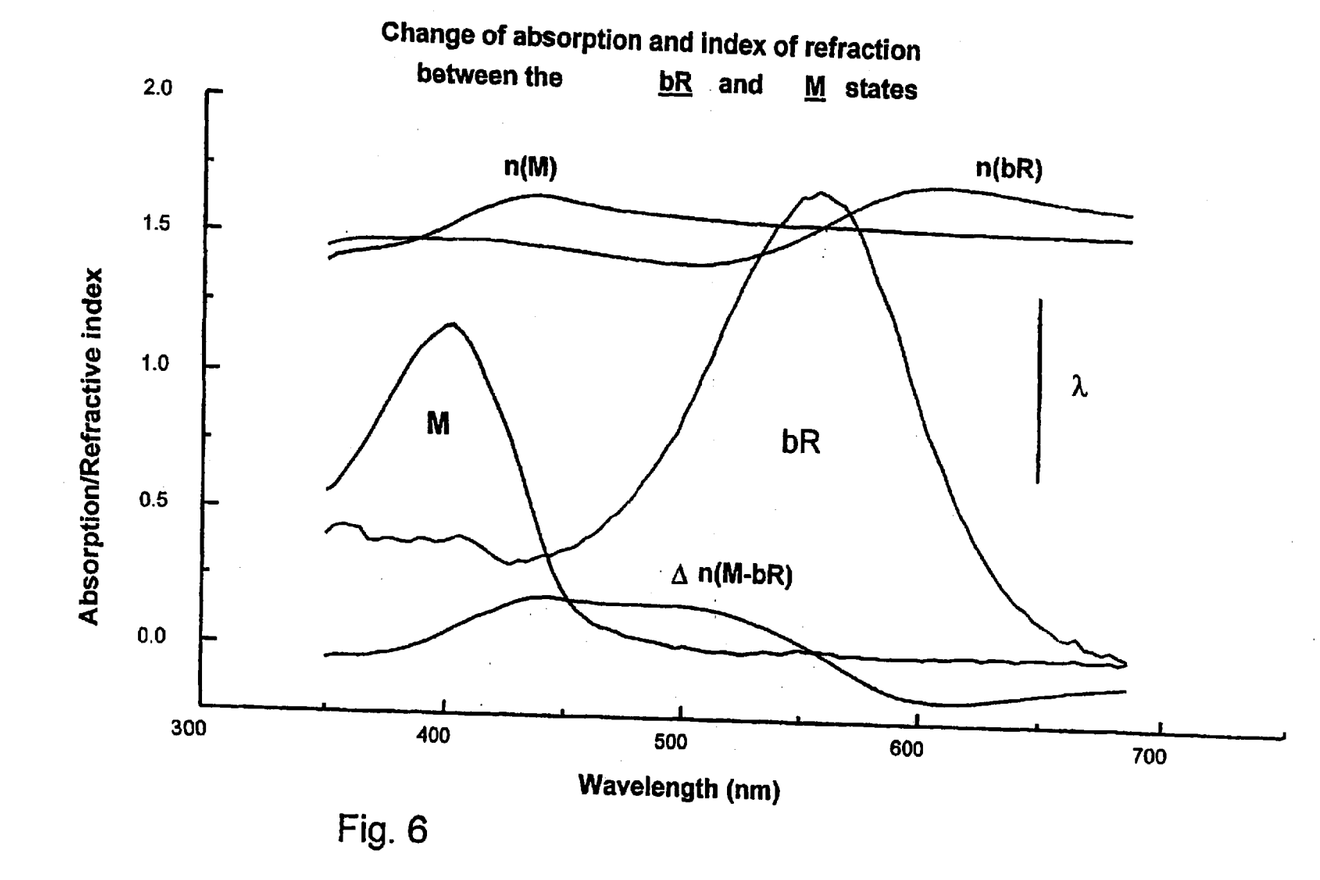
FIG. 6 is a diagram showing a demonstration of the refractive index change during the bR to M transition. The spectra span from 350 nm to 680 nm. The red and blue lines depict the spectra/refractive indices of the ground state (bR) and the M intermediate, respectively, while the black line shows the shape of refractive index change calculated from the Kramers-Kronig relation. (The amplitudes are given in arbitrary units.)

For the measurement of light-induced refractive index changes of the bacteriorhodopsin film, the waveguide (9) was tuned to the resonance maximum of the incoupled light by the help of the rotational turntable (8). Short ($\cong$20 ns) flashes of 590 nm from an excimer-laser-driven dye laser (here Rhodamine 6G), were used to trigger the bacteriorhodopsin photocycle. Intensity changes of the guided light (and also those corresponding to absorption changes during the photocycle) were detected by a photodiode, and recorded by a digital storage oscilloscope (LeCroy 9310L). Traces measured with 50 $\mu$s time resolution were fitted by 2 exponentials (FIG. 4). FIG. 5 shows the angular dependence of the amplitudes of the exponential components. The angular distribution of the components can be interpreted as a result of both refractive index and absorption changes. In order to decompose the signals in terms of the two effects, the angular dependence of the fast component was fitted with two Gaussians. From their angular shifts ($\Delta\Phi_1$ and $\Delta\Phi_2$ as compared to the resonance curve), taking into account the absorption kinetics, we calculated the refractive index changes during the photocycle. The amplitude (i.e. the maximum of the refractive index change during the photocicle) ($5\times10^{-3}$) and the sign of this change is consistent with the refractive index shift calculated by the help of the Kramers-Kronig relations from the absorption change in the M$\rightarrow$bR transition of the photocycle (FIG. 6). The measurements undoubtedly proved the feasibility of optical switching based on the light-induced refractive index changes of bacteriorhodopsin.

Figure 8:
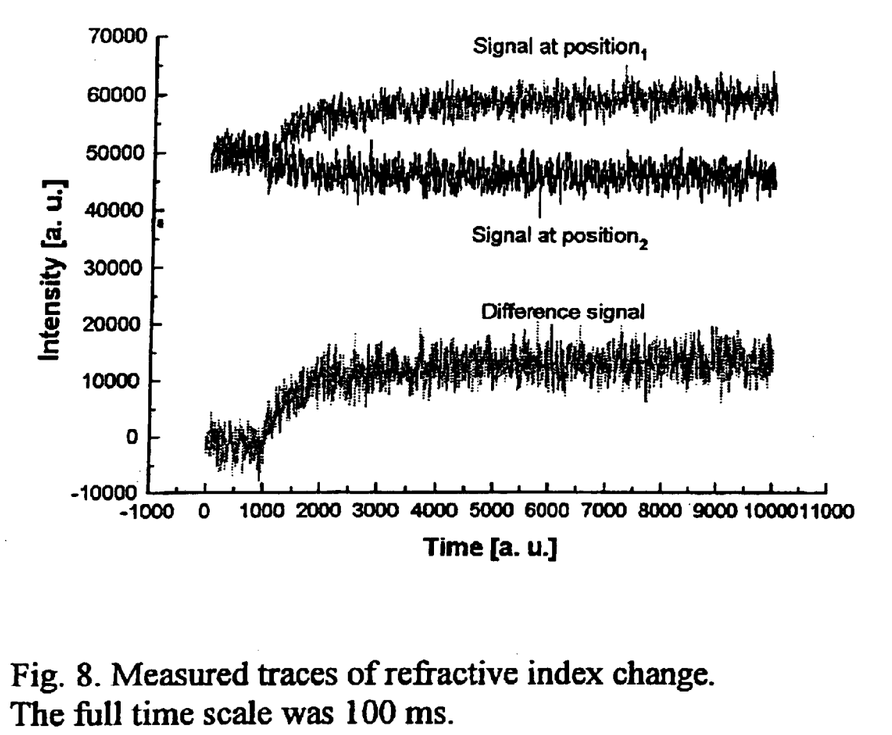
FIG. 8 is a diagram showing measured traces of refractive index change upon quasi-stationary illumination.
Figure 9:
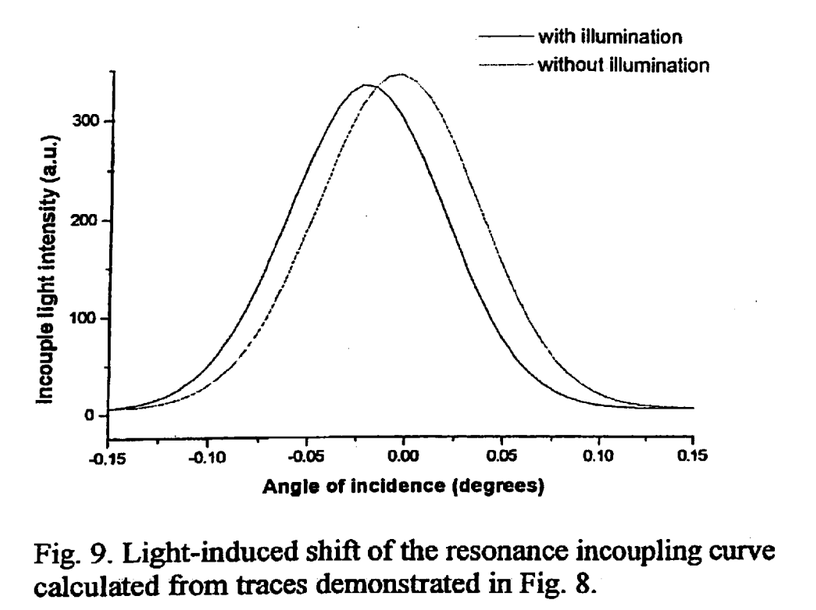
FIG. 9 is a diagram showing light-induced shift of the resonance incoupling curve from the data in FIG. 8, wherein the reference position is at the maximal incoupling of the sample without illumination.

To give a further, preferred example for switching, light-induced refractive index changes were measured also by quasi-stationary excitation. The experimental setup was similar to that in FIG. 2, except that the photocycle was initiated via stepwise illumination by a 10 mW He—Ne laser (wavelength=637 nm) (Melles Griot), and refractive index changes were measured at 677 nm, with the light of a solid-state laser (Lasiris Inc., Ashby, Canada, 8 mW). The humidity of the sample was controlled by a closed chamber containing saturated salt solutions so as to buffer relative humidity. Optimal results (i.e. biggest refractive index changes) were found between 30 and 50% relative humidities. Traces measured at 30% relative humidity, detected at incoupling angles on different sides of the resonance peak (position 1 and position 2) are depicted in FIG. 8. The amplitude of the refractive index changes is $5\times10^{-3}$, corresponding to the light-induced bR-M transition. In this case, the kinetics of the signals is limited by the intensity of the exciting light. The resonance curves of incoupling determined for the TE mode are shown, with and without illumination of the sample, in FIG. 9. As it can he estimated from the figure, the maximal relative light-induced intensity change of the incoupled light is about 2 (at position 0.05). This effect is expected to be optimized by chemical or genetic modifications of bacteriorhodopsin.

A further, alternative way of creating fast switching effects can be manifested in the future via double excitation. In such cases those properties of the bR photocycle can be utilized, that most of the intermediates may be driven back to the ground state by light [Balashov, S. P. (1995)]. By this method the bacteriorhodopsin is transferred (via excitation by a green or red light) to a state in which it is unsusceptible to excitation by the additional red light used more often in optical (switching) applications. By applying a blue flesh in this state a fast M to bR transition is generated. Thereby, a more efficient and rapid switching can be achieved.

Example 3

Creation of bR-Based Dynamic Holographic Grating

By the help of a further experiment we demonstrated that an NLO material in an ad-medium (3) (e.g. a bacteriorhodopsin film) can serve as a material for dynamic holographic grating, and as such, an incoupling device for optical waveguides (FIG. 7). Using the blue line of a He—Cd laser, we induced a 2400 line pair/mm grating in the glass-supported bacteriorhodopsin film (17) fixed by ultra-low-melting-point agarose of high optical purity. Light beam of a red He—Ne laser beam source (7) was incident on the grating, and the first-order diffraction beam was monitored. The time for development and release of the grating corresponded to the rate-limiting steps of the photocycle of a dried bR film (not shown). The latter experiment proved that bacteriorhodopsin can serve as an optically switchable, dynamic incoupling (or outcoupling) grating.

The outcoupled light beam can be detected as described above.

By using proteins as NLO materials and applying waveguide technology, the invention renders possible to solve a number of problems (and opens a path for the solution of many more), which occurred in the field of integrated optics, such as building easy to use, stable devices, achieving a reliable switching and creating a sufficient versatility due to many possibilities in modifying parameters such as wavelength, design or in mutating the proteins, connecting several optical elements, and thereby creating simple logical circuits.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

List of Abbreviations

| | |
|---|---|
| NLO | nonlinear optical |
| LB | Langmuir-Blodgett (film) |
| bR | bacteriorhodopsin (ground state) |
| IOD | integrated optical device |
| $^1O_2$ | singlet oxygen |
| $SiO_2$ | silicon oxyde |
| $TiO_2$ | titanium oxyde |
| Nd: YAG | neodymium yttrium aluminum garnet |
| He—Cd | helium-cadmium |
| EPR | electron paramagnetic resonance |

What is claimed is:

1. A fully light-controllable integrated optical switch applicable in a slab geometry configuration, comprising:
   a waveguide comprising a planar support and a wave-carrying medium;
   at least one means for coupling light into and/or out of the waveguide; and
   an ad-layer in contact with the waveguide, the ad-layer comprising a photochromic protein as a material of non-linear optical property, wherein switching of a light propagating in the waveguide is effected by a change of an optical property of the ad-layer caused by a light-induced transition of the photochromic protein from one defined molecular state to another.

2. The integrated optical switch according to claim 1, wherein:
the optical property changed is refractive index,
and the transition of the photochromic protein in the ad-layer corresponds to a ground state—intermediate or intermediate—ground state transition of the said protein and thereby the propagation of the light is allowed or arrested in the waveguide.

3. The integrated optical switch of claim 2, wherein the at least one means for coupling light into or out from the waveguide comprises a permanent grating at the boundary surface of the ad-layer and/or a permanent grating in the ad-layer and/or transient grating in the ad-layer.

4. The integrated optical switch of claim 2, wherein the photochromic protein in the ad-layer is a member of the rhodopsin family, and the photochromic protein is in a matrix comprising a transparent, inert, film-forming material.

5. The integrated optical switch according to claim 2, wherein the thickness of the wave-carrying medium is less than 200 nm.

6. The integrated optical switch according to claim 2, wherein the ad-layer is in contact with the surface of the waveguide such that light propagates parallel to the ad-layer.

7. A fully light-controllable integrated optical logical device of slab geometry, comprising at least one optical switch of claim 1 as building block(s).

8. An integrated optical module comprising more than one optical logical device of claim 7 on a substrate connected to form a logical circuit.

9. The integrated optical switch according to claim 1, wherein the ad-layer is in contact with the surface of the waveguide such that light propagates parallel to the ad-layer.

10. The integrated optical switch according to claim 1, wherein the thickness of the wave-carrying medium is less than 200 nm.

11. The integrated optical switch of claim 1, wherein the at least one means for coupling light into or out from the waveguide comprises a permanent grating at the boundary surface of the ad-layer and/or a permanent grating in the ad-layer and/or transient grating in the ad-layer.

12. The integrated optical switch of claim 1, wherein
the photochromic protein in the ad-layer is a member of the rhodopsin family, and
the photochromic protein is in a matrix comprising a transparent, inert, film-forming material.

13. A method for carrying out switching using a fully light-controllable integrated optical logical device including a waveguide comprising a planar support and a wave-carrying medium, and in contact with the waveguide an ad-medium comprising a photochromic protein as a material of non linear optical property, comprising the steps of:
coupling a monochromatic light into and/or out of the waveguide;
changing an optical property of the ad-medium by inducing a transition of the photochromic protein from one defined molecular state to another by using a control light and by changing the optical property of the ad-medium, propagation or coupling in or out of the light is allowed or arrested and thereby effecting switching of a light in the waveguide.

14. The method of claim 13, wherein light in the waveguide is a laser beam and the optical property changed is refractive index, and the control light is a controlling laser.

15. The method of claim 14, wherein:
i) the monochromatic light is coupled into the waveguide in a well defined angle using a grating, preferably a permanent grating and
ii) the refractive index of the ad-medium covering, at least partially, the grating, is changed.

16. A method for the preparation of a fully light controllable integrated optical device comprising a photochromic protein as a material of non linear optical property, comprising the steps of:
i) coating the surface of a waveguide comprising a planar support and a wave-carrying medium, with an ad-medium, preferably an ad-layer, comprising a photochromic protein of non linear optical property, and
ii) preparing, within the ad-layer, either a permanent grating by holographic bleaching or a transient, holographic grating by the interference of two identical laser beams
wherein
a water suspension of the photochromic protein is prepared,
the suspension is mixed with an inert, film-forming material, a final concentration of which is 0.1 to 0.6%,
the obtained medium is applied to the waveguide, and dried.

17. The method according to claim 16, wherein the inert, film-forming material comprises gelatin and the photochromic protein is bacteriorhodopsin.

18. The method according to claim 17, wherein the final concentration of gelatin is 0.4 to 0.55%.

19. The method according to claim 16, wherein the final concentration of inert, film-forming material is 0.5%.

20. The method according to claim 16, wherein the obtained medium is dried-under laminar air flow.

21. A method for the preparation of a fully light controllable integrated optical device comprising a photochromic protein as a material of non linear optical property, comprising the steps of:
i) coating the surface of a waveguide comprising a planar support and a wave-carrying medium, with an ad-layer comprising a non-linear optical photochromic protein and,
ii) preparing, within the ad-layer, either a permanent grating by holographic bleaching or a transient, holographic grating by the interference of two identical laser beams
wherein
a water suspension of the photochromic protein is prepared,
the suspension is mixed with an inert, film-forming material,
the obtained medium is applied to the waveguide, and dried.

22. A fully light-controllable integrated optical switch applicable in a slab geometry configuration, comprising:
a waveguide comprising a planar support and a wave-carrying medium;
at least one means for coupling light into and/or out from the waveguide; and
an ad-medium in contact with the waveguide and at least partially covering the at least one means for coupling, the ad-medium is an ad-layer comprising a photochromic protein as a material of non-linear optical property, wherein switching of a light propagating in the waveguide is effected by a change of refractive index of the ad-medium caused by a light-induced transition of the photochromic protein from one defined molecular state to another, wherein the transition of the photochromic protein in the ad-layer corresponds to a ground state—intermediate or intermediate—ground state transition of the said protein and thereby the propagation of the light is allowed or arrested in the waveguide, wherein upon logical operation the refractive index of the part of the ad-layer covering the at least one means for coupling is changed.

23. The integrated optical switch according to claim 22, wherein the at least one means for coupling light into and/or out of the waveguide comprises a grating in or on the surface of the waveguide or a prism.

24. The integrated optical switch according to claim 23, wherein the grating is a permanent grating.

25. The integrated optical switch according to claim 22, wherein a thickness of the wave-carrying medium is less than 200 nm.

26. The integrated optical switch according to claim 22, wherein the photochromic protein in the ad-layer is a member of the rhodopsin family, and the photochromic protein is in a matrix of a transparent, inert, film-forming material.

* * * * *